(12) United States Patent
Cleveland (10) Patent No.: US 10,351,245 B2
(45) Date of Patent: Jul. 16, 2019

(54) RAMP MOUNT

(71) Applicant: Safran Seats USA LLC, Gainesville, TX (US)

(72) Inventor: Adrian R. Cleveland, Whitesboro, TX (US)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 16/132,097

(22) Filed: Sep. 14, 2018

(65) Prior Publication Data

US 2019/0009911 A1    Jan. 10, 2019

Related U.S. Application Data

(63) Continuation of application No. 15/735,787, filed as application No. PCT/US2016/016014 on Feb. 1, 2016, now Pat. No. 10,106,261.

(Continued)

(51) Int. Cl.
  *B64D 11/06* (2006.01)
  *B60N 2/02* (2006.01)
  (Continued)

(52) U.S. Cl.
  CPC .............. *B64D 11/064* (2014.12); *B60N 2/02* (2013.01); *B60N 2/12* (2013.01); *B60N 2/28* (2013.01);
  (Continued)

(58) Field of Classification Search
  USPC ........................................................ 248/420
  See application file for complete search history.

(56) References Cited

U.S. PATENT DOCUMENTS 2,892,486 A   6/1959   Herring et al.
3,167,298 A   1/1965   Senkowski et al.
(Continued)

FOREIGN PATENT DOCUMENTS

GB   2014442   8/1979

OTHER PUBLICATIONS

International Patent Application No. PCT/US2016/016014, Search Report and Written Opinion, dated May 12, 2016.
(Continued)

*Primary Examiner* — David E Allred
(74) *Attorney, Agent, or Firm* — Kilpatrick Townsend & Stockton LLP; Dean W. Russell; Davidson G. Lucas (57) ABSTRACT

Ramp mounts may facilitate the movement of a passenger seat pan relative to a passenger seat frame during movement of the seat pan between an upright position and a recline position relative to the passenger seat frame. During cycling of the seat pan from the recline position to the upright position, ramp mounts may break. Embodiments of the ramp mount disclosed herein may increase the ramp mount durability so as to reduce the instances of ramp mounts breaking during cycling of the seat pan between the recline and upright positions. Additionally, some embodiments may provide for a ramp mount that has fewer components. Such embodiments may simplify coupling of the ramp mount to a seat pan and may reduce passenger seat system assembly time. Moreover, in some embodiments, the reduced number of components may further reduce manufacturing time and/or costs—thereby providing a relatively low cost ramp mount.

19 Claims, 5 Drawing Sheets

Related U.S. Application Data (60) Provisional application No. 62/186,201, filed on Jun. 29, 2015.

(51) Int. Cl.
  *B60N 2/12* (2006.01)
  *B60N 2/28* (2006.01)
  *B60N 2/30* (2006.01)
  *B60N 2/427* (2006.01)

(52) U.S. Cl.
  CPC ......... *B60N 2/2821* (2013.01); *B60N 2/2884* (2013.01); *B60N 2/3065* (2013.01); *B60N 2/42736* (2013.01); *B60N 2002/0212* (2013.01); *B60N 2002/0216* (2013.01)

(56) References Cited

U.S. PATENT DOCUMENTS

| | | | |
|---|---|---|---|
| 3,841,696 A | 10/1974 | Wagner | |
| 4,860,988 A | 8/1989 | Rees et al. | |
| 5,584,534 A * | 12/1996 | Kuranami | B60N 2/245 297/411.32 |
| 5,860,701 A | 1/1999 | Jungjohann et al. | |
| 6,227,616 B1 | 5/2001 | Branke et al. | |
| 7,073,860 B2 | 7/2006 | Markus | |
| 7,611,202 B2 | 11/2009 | Johnson et al. | |
| 7,794,017 B2 | 9/2010 | Kan et al. | |
| 9,414,684 B2 * | 8/2016 | Park | A47C 1/03255 |
| 9,918,552 B2 * | 3/2018 | Battey | A47C 1/032 |
| 2005/0280301 A1 | 12/2005 | Freed et al. | |
| 2008/0122276 A1 | 5/2008 | Fransen et al. | |
| 2009/0302158 A1 | 12/2009 | Darbyshire et al. | |
| 2011/0084530 A1 | 4/2011 | Lockwood et al. | |
| 2011/0309664 A1 * | 12/2011 | Parker | A47C 1/023 297/340 |
| 2012/0205952 A1 * | 8/2012 | Takeuchi | A47C 1/03 297/300.1 |
| 2013/0154314 A1 | 6/2013 | Romero | |
| 2016/0120315 A1 * | 5/2016 | Robertson | A47C 1/03294 297/86 |
| 2016/0280378 A1 | 9/2016 | Le | |
| 2018/0134182 A1 * | 5/2018 | Hoshide | B60N 2/0727 |

OTHER PUBLICATIONS

U.S. Appl. No. 15/735,787, Notice of Allowance, dated Jun. 22, 2018.

* cited by examiner

VIEW A-A

Figure 8

SECTION B-B

Figure 9

SECTION C-C

Figure 10

RAMP MOUNT

CROSS-REFERENCE TO RELATED APPLICATIONS

This is a continuation of U.S. Nonprovisional patent application Ser. No. 15/735,787 ("the '787 application"), filed Dec. 12, 2017, which application is the U.S. national phase entry of International Patent Application Serial No. PCT/US2016/016014 ("the '014 application"), filed Feb. 1, 2016, entitled Ramp Mount, which application is related to and claims priority benefits from U.S. Provisional Patent Application Ser. No. 62/186,201 ("the '201 application"), filed Jun. 29, 2015, entitled One Piece Bottom Diaphragm Ramp-Mount. The '787, '014, and '201 applications are herein incorporated in their entireties by this reference.

FIELD OF THE INVENTION

The disclosure relates to ramp mounts and passenger seats including ramp mounts.

BACKGROUND

The present disclosure generally relates to ramp mounts for use in passenger seat systems. In particular embodiments, the ramp mounts may be designed for use in aircraft passenger seats.

In some passenger seat systems, a passenger seat backrest may be configured to recline from an upright position to a reclined position. During movement of the passenger seat backrest to the reclined position, a passenger seat pan (or diaphragm) may also be configured to transition from an upright position to a recline position. The passenger seat pan may be coupled with a ramp mount to facilitate this movement relative to the passenger seat frame.

While many ramp mount designs have been implemented and proposed, still further improvements may be desired.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

In some aspects of the present disclosure, a ramp mount for use in a passenger seat system may be provided. The ramp mount may include a first side wall having a top side, a bottom side opposite the top side, an outer surface, and an inner surface opposite the outer surface. A second side wall may be provided that is spaced apart from the first side wall. The second side wall may have a top side, a bottom side opposite the top side, an outer surface, and an inner surface opposite the outer surface. The inner surface of the second side wall may be facing the inner surface of the first side wall. A front crosspiece may be integrated with a front portion of the first side wall and a front portion of the second side wall to couple the front portions of the first side wall and the second side wall. A back crosspiece may be integrated a back portion of the first side wall and a back portion of the second side wall to couple the back portions of the first side wall and the second side wall. A plurality of ribs may be provided that extend between the front crosspiece and the back crosspiece. The bottom side of the first side wall may be molded to form a first rim that extends toward the second side wall. A front end of the first rim may be spaced apart from a front end of the first side wall by a first gap. The bottom side of the second side wall may be molded to form a second rim that extends toward the first side wall. A front end of the second rim may be spaced apart from a front end of the second side wall by a second gap. A track may be defined, at least in part, by the first rim and the second rim. The track may be configured for slideably engaging with a slider of the passenger seat system. An opening of the track may be defined in part by the first gap and the second gap. The opening of the track may be configured for receiving the slider into the track.

In certain embodiments, the track may be configured to engage with the slider such that the slider moves linearly.

In some embodiments, the plurality of ribs may each have a top side that is coplanar with the top side of the first side wall and the second side wall. The top sides of the first wall, the second side wall, and the plurality of ribs may define a top surface of the ramp mount that is configured to be coupled with a passenger seat diaphragm.

Optionally, the track is not parallel to the top surface of the ramp mount in certain embodiments. In some embodiments, the track may be at an angle between 7-25 degrees relative to the top surface of the ramp mount. For example, in some embodiments, the angle may be between 15-20 degrees (e.g., 18 degrees in certain embodiments).

The plurality of ribs may comprise three parallel ribs that extend from the front crosspiece to the back crosspiece. The three ribs may be spaced apart from one another by gaps.

The first side wall may include a first hole extending from the outer surface of the first side wall to the inner surface of the first side wall. The first hole of the first side wall may be positioned between the front end of the first side wall and the front end of the first rim. The second side wall may include a second hole extending from the outer surface of the second side wall to the inner surface of the second side wall. The second hole of the second side wall may be positioned between the front end of the second side wall and the front end of the second rim. The first hole and the second hole may be axially aligned to receive a pin therethrough. The pin may block the opening to prevent the slider from disengaging with the track through the opening when the pin is received through the first and second holes.

In some embodiments, one or more tabs may be molded to the top side of the first side wall and may be extending outwardly. Additionally, one or more tabs may be molded to the top side of the second side wall and may be extending outwardly. The tabs may include a hole for receiving a rivet therethrough for securing the ramp mount to a seat diaphragm.

One or more structural fins may be provided that extend between a bottom surface of the one or more tabs molded to the top side of the first side wall and the outer surface of the first side wall. One or more structural fins may be provided that extend between a bottom surface of the one or more tabs molded to the top side of the second side wall and the outer surface of the second side wall.

The structural fins may increase in cross-sectional area from a bottom of each respective structural fin to a top of the respective structural fins where the structural fins joins the respective tab.

The one or more tabs molded to the top side of the first side wall may include a front tab integrated with the front portion of the first side wall and a back tab integrated with the back portion of the first side wall. The one or more structural fins extending between the bottom surface of the one or more tabs molded to the top side of the first side wall may include at least one structural fin joining the front tab with the first side wall and at least two structural fins joining the back tab with the first side wall. The one or more tabs molded to the top side of the second side wall may include a front tab integrated with the front portion of the first side wall and a back tab integrated with the back portion of the second side wall. The one or more structural fins extending between the bottom surface of the one or more tabs molded to the top side of the second side wall may include at least one structural fin joining the front tab with the second side wall and at least two structural fins joining the back tab with the second side wall.

In further aspects, a ramp mount for use in a passenger seat system may be provided that includes a first side wall having a top side, a bottom side opposite the top side, an outer surface, and an inner surface opposite the outer surface; a second side wall spaced apart from the first side wall, the second side wall having a top side, a bottom side opposite the top side, an outer surface and an inner surface opposite the outer surface; a front wall integrated with a front portion of the first side wall and a front portion of the second side wall; and a back wall integrated a back portion of the first side wall and a back portion of the second side wall. The bottom side of the first side wall may be molded to form a first rim that extends toward the second side wall. The front end of the first rim may be spaced apart from a front end of the first side wall by a first gap. The bottom side of the second side wall may be molded to form a second rim that extends toward the first side wall. A front end of the second rim may be spaced apart from a front end of the second side wall by a second gap. The first rim and the second rim may define a track configured for slideably engaging with a slider. An opening of the track may be defined in part by the first gap and the second gap. The opening of the track may be configured for receiving the slider into the track. The top sides of the first wall and the second side wall define a top surface of the ramp mount that may be configured to be coupled with a passenger seat diaphragm. The track may be not parallel to the top surface of the ramp mount.

In some embodiments, the track may be at an angle between 7-25 degrees relative to the bottom surface of the ramp mount (e.g., 15-20 degrees), in accordance with the passenger place width.

In still further aspects of the present disclosure, a ramp mount for use in a passenger seat system may be provided that includes: a first side wall having a top side, a bottom side opposite the top side, an outer surface, and an inner surface opposite the outer surface; a second side wall spaced apart from the first side wall, the second side wall having a top side, a bottom side opposite the top side, an outer surface and an inner surface opposite the outer surface; a front wall integrated with a front portion of the first side wall and a front portion of the second side wall; and a back wall integrated a back portion of the first side wall and a back portion of the second side wall. The bottom side of the first side wall may be molded to form a first rim that extends toward the second side wall. A front end of the first rim may be spaced apart from a front end of the first side wall by a first gap. The bottom side of the second side wall may be molded to form a second rim that extends toward the first side wall. A front end of the second rim may be spaced apart from a front end of the second side wall by a second gap. The first rim and the second rim may define a track configured for slideably engaging with a slider. An opening of the track may be defined in part by the first gap and the second gap. The opening of the track may be configured for receiving the slider into the track. The first side wall may include a first hole extending from the outer surface of the first side wall to the inner surface of the first side wall. The first hole of the first side wall may be positioned between the front end of the first side wall and the front end of the first rim. The second side wall may include a second hole extending from the outer surface of the second side wall to the inner surface of the second side wall. The second hole of the second side wall may be positioned between the front end of the second side wall and the front end of the second rim. The first hole and the second hole may be axially aligned to receive a pin therethrough. The pin may block the opening to prevent the slider from disengaging with the track through the opening when the pin is received through the first and second holes.

The pin may be provided in some embodiments. The pin may be a quick release pin according to some embodiments of the present disclosure. Optionally, in some embodiments, the pin does not engage with a ramp latch when received through the first hole and the second hole.

A plurality of ribs may be provided that extend between the front wall and the back wall. The plurality of ribs may each have a top side that is coplanar with the top side of the first side wall and the second side wall.

In some embodiments, a ramp mount may be provided where the ramp mount is formed entirely from one piece of injection molded material. The injection molded material may be a plastic.

In still further embodiments, a passenger seat may be provided that includes a ramp mount of the present disclosure. The passenger seat may further include a diaphragm coupled with the ramp mount. Optionally, a bracket may not be used to couple the ramp mount with the diaphragm. In still further aspects, the passenger seat may be an aircraft passenger seat.

In certain aspects, an aircraft may be provided that includes a passenger seat having a ramp mount disclosed herein.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Ramp mounts may facilitate the movement of a passenger seat pan relative to a passenger seat frame during movement of the seat pan between an upright position and a recline position relative to the passenger seat frame. During cycling of the seat pan from the recline position to the upright position, ramp mounts may break. Embodiments of the ramp mount disclosed herein may increase the ramp mount durability so as to reduce the instances of ramp mounts breaking during cycling of the seat pan between the recline and upright positions. Additionally, some embodiments may provide for a ramp mount that has fewer components. Such embodiments may simplify coupling of the ramp mount to a seat pan and may reduce passenger seat system assembly time. Moreover, in some embodiments, the reduced number of components may further reduce manufacturing time and/or costs—thereby providing a relatively low cost ramp mount.

In some embodiments, the ramp mount may be integrally manufactured together as a unitary one-piece construction. These integrally formed one-piece ramp mount embodiments may eliminate the usage of multi-piece designs, which are more complex to manufacture and to assemble. Accordingly, some embodiments may reduce material costs, and assembly time and may also reduce the number of parts needed for assembly. Embodiments of the one piece ramp mount may be manufactured by injection molding. Optionally, the one-piece ramp mount may be manufactured from a single piece of molded plastic.

Additionally, embodiments disclosed herein may provide a longer service life that resists premature breaking during cycling of a seat between the recline and upright positions. Some embodiments of the present disclosure may be particularly useful when the bottom seat pan is in the upright position, when not in use, to allow easy entry to the seat electrical components, specific details of which are set forth below such as assembly and exemplary dimensions.

Figure 1:
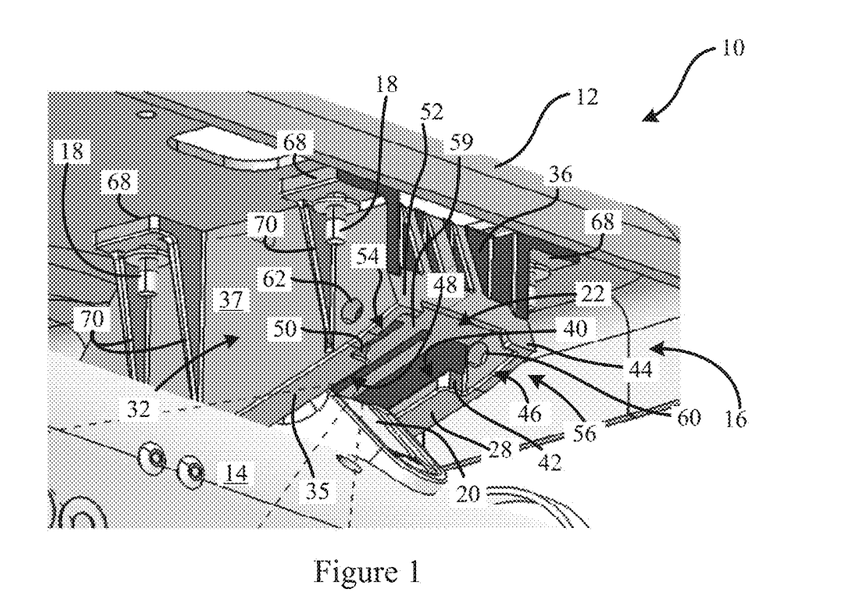
FIG. 1 shows an exemplary passenger seat system according to some embodiments of the present invention.

FIG. 1 shows an exemplary passenger seat system 10 according to some embodiments of the present disclosure. Passenger seat system 10 includes a seat diaphragm 12, a seat frame 14, and a mount 16 coupling the seat diaphragm 12 to the seat frame 14. As illustrated, the mount 16 may be coupled to the seat diaphragm 12 via one or more rivets 18. Mount 16 may be coupled to seat frame 14 via coupling between a slider 20 of seat frame 14 and a corresponding track 22 of mount 16. During transition of the seat diaphragm 12 between an upright position and a recline position relative to the seat frame 14, the slider 20 of seat frame 14 is configured to slide along track 22 of mount 16. When seat diaphragm 12 moves into the upright position from the recline position relative to the seat frame 14, the track 22 of mount 16 limits further movement of slider 20 along the track 22 to maintain the seat diaphragm 12 in the upright position. Similarly, when seat diaphragm 12 moves into the recline position from the upright position relative to the seat frame 14, the track 22 of mount 16 will also limit further movement of slider 20 along the track 22 to maintain the seat diaphragm 12 in the recline position. FIG. 1 shows diaphragm 12 in the recline position relative to frame 14. As can be seen, slider 20 is positioned along a back portion of track 22 of mount 16 when diaphragm 12 is in the recline position. Further details of embodiments of mount 16 are described further below.

Figure 2:
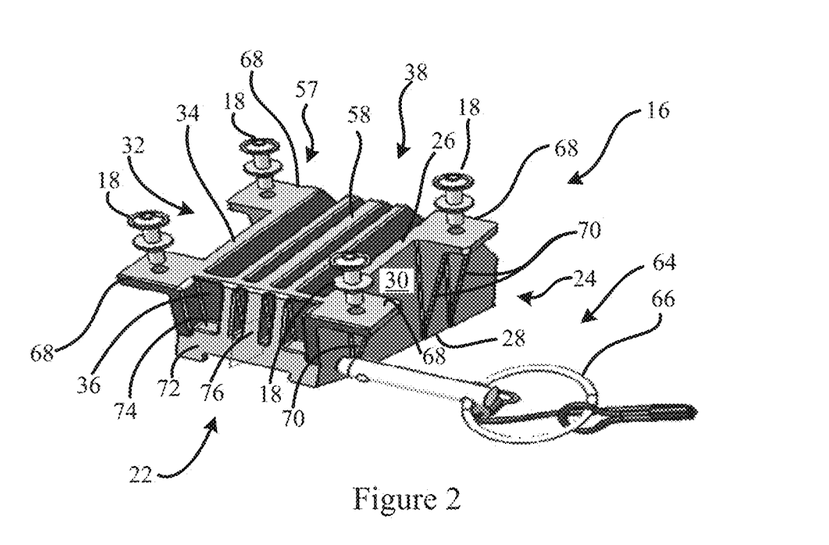
FIG. 2 shows an exemplary ramp mount according to some embodiments of the present invention.

FIG. 2 shows the exemplary ramp mount 16 of FIG. 1 according to some embodiments of the present disclosure. Ramp mount 16 may include a first side wall 24 having a top side 26, a bottom side 28, and an outer surface 30. Ramp mount 16 may further include a second side wall 32 having a top side 34, a bottom side 35, and an outer surface 37 (FIG. 1). A front crosspiece 36 (or wall) may be integrated with a front portion of the first side wall 24 and a front portion of the second side wall 32 to couple the front portions of the first side wall 24 and the second side wall 32. A plurality of spaced apart ribs 38 may extend from the front crosspiece 36 and may be disposed between the first side wall 24 and the second side wall 32.

As can be seen in FIG. 1, the bottom side 28 of the first side wall 24 may be molded to form a first rim 40 that extends toward the second side wall 32. A front end 42 of the first rim 40 may be spaced apart from a front end 44 of the first side wall 24 by a first gap 46. The bottom side 35 of the second side wall 32 may be molded to form a second rim 48 that extends toward the first side wall 24. A front end 50 of the second rim 48 may be spaced apart from a front end 52 of the second side wall 32 by a second gap 54.

The track 22 may be defined in part by the first rim 40 and the second rim 48. An opening 56 of the track 22 may be defined in part by the first gap 46 and the second gap 54. The opening 56 of the track 22 may be configured for receiving the slider 20 into the track 22 or removing the slider 20 therefrom to disengage the front portion of seat diaphragm 12 from the portion of seat frame 14 having slider 20.

The top sides 26, 34 of the first side wall 24 and the second side wall 32 may define a top surface 57 of the ramp mount 16 that is configured to be coupled with a passenger seat diaphragm 12. In the illustrated embodiment 16, the track 22 is not parallel to the top surface 57 of the ramp mount 16. Further, the plurality of ribs 38 may each have a top side 58 that is coplanar with the top sides 26, 34 of the first side wall 24 and the second side wall 32, and the top sides 26, 34, 58 of the first side wall 24, the second side wall 32, and the plurality of ribs 38 may define the top surface 57 of the ramp mount 16. The track 22 may be at an angle between 15-20 degrees relative to the top surface 57 of the ramp mount 16. Optionally, in some embodiments, the angle may be between 7-25 degrees. While illustrated as including three parallel spaced apart ribs 38 that extend from the front crosspiece 36, it should be understood that this is exemplary and non-limiting. Embodiments of the present disclosure may include fewer (e.g., one or two) or more (four, five, etc.) ribs 38 in other embodiments. Further, mount 16 may include a back crosspiece coupled (e.g., integrally) with a back portion of the first side wall 24 and a back portion of the second side wall 32 to couple the back portions of the first side wall 24 and the second side wall 32. The plurality of ribs 38, may couple (e.g., integrally) the front crosspiece 36 with the back crosspiece so as to provide additional structural strength for mount ramp 16. The gaps between the plurality of ribs 28 may provide some material cost savings for mount 16. In some embodiments, the plurality of ribs 38 may each have a bottom side 59 that is coplanar with one another. The bottom sides 59 of the plurality of ribs 38 may define a portion of the track 22. Optionally, slider 20 may be configured to slide along the surface defined by the bottom sides 59 of the plurality of ribs 38 when the slider 20 translates along the track 22 during movement of the diaphragm 12 between an upright and a recline position relative to frame 14.

The first side wall 24 may include a first hole 60 extending from the outer surface 30 of the first side wall 24 to the inner surface of the first side wall 24. The first hole 60 of the first side wall 24 may be positioned between the front end 44 of the first side wall 24 and the front end 42 of the first rim 40. The second side wall 32 may include a second hole 62 extending from the outer surface 37 of the second side wall 32 to the inner surface of the second side wall 32. The second hole 62 of the second side wall 32 may be positioned between the front end 52 of the second side wall 32 and the front end 50 of the second rim 48. The first hole 60 and the second hole 62 may be axially aligned to receive a pin 64 therethrough (FIG. 2). The pin 64 may block the opening 56 to prevent the slider 20 from disengaging with the track 22 through the opening 56 when the pin 64 is received through the first and second holes 60, 62. In some embodiments, the pin 64 is a quick release pin. Optionally, the pin 64 includes a ring 66 proximal end of the pin 64 which may allow the pin to be easily grasped and removed.

Further one or more tabs 68 may be molded to the top side 26 of the first side wall 24 and may be extending outwardly. One or more tabs 68 may be molded to the top side 34 of the second side wall 32 and may be extending outwardly. The tabs 68 may include a hole for receiving a rivet 18 therethrough for securing the mount 16 to a passenger seat diaphragm 12.

One or more structural fins 70 may extend between a bottom surface of the one or more tabs 68 molded to the top side 26 of the first side wall 24 and the outer surface 30 of the first side wall 24. One or more structural fins 70 may also extend between a bottom surface of the one or more tabs 68 molded to the top side 34 of the second side wall 32 and the outer surface 37 of the second side wall 32. The structural fins 70 may increase in cross-sectional area from a bottom of each respective structural fin 70 to a top of the respective structural fin 70 where the structural fin 70 joins the respective tab 68.

The tabs 68 molded to the top side 26 of the first side wall 24 may include a front tab integrated with the front portion of the first side wall 24 and a back tab integrated with the back portion of the first side wall 24. The tabs 68 molded to the top side 34 of the second side wall 32 may include a front tab integrated with the front portion of the second side wall 32 and a back tab integrated with the back portion of the second side wall 32. While illustrated with two tabs 68 molded with the top side 26 of first side wall 24 and the top side 34 of second side wall 32, respectively, it should be understood that fewer (e.g., one) or more (e.g., three, four, etc.) tabs 68 may be provided on each side in other embodiments. Additionally, while mount 16 is illustrated with one structural fin 70 joining the front tab 68 with the first side wall 24 and front tab 68 of the second side wall, respectively, and two structural fins 70 joining the back tab 68 with the first side wall 24 and back tab 68 of second side wall, respectively, it should be understood that such a configuration is exemplary and non-limiting. Fewer (e.g., none, one) or more (e.g., three or more) structural fins 70 may be associated with each of the tabs 68 in other embodiments.

Track 22 may further be defined by a front wall 72 (FIG. 2). The front wall 72 may have a top surface 74. A plurality of structural fins 76 may couple the top surface 74 of the front wall 72 with an outer surface of front wall 36. The structural fins 76 may have a cross-sectional area that is greatest at the top surface 74 of the front wall 72 and that may decrease as the structural fins 76 extend toward the top surface 57 of mount 16. Optionally, the structural fins 76 may have a front surface that is coplanar with a front surface of front wall 72. In some embodiments, the structural fins 76 may correspond with one of the plurality of ribs 38. Optionally, the side surfaces of structural fins 76 may be coplanar with side surfaces of an associated rib 38.

Figure 3:
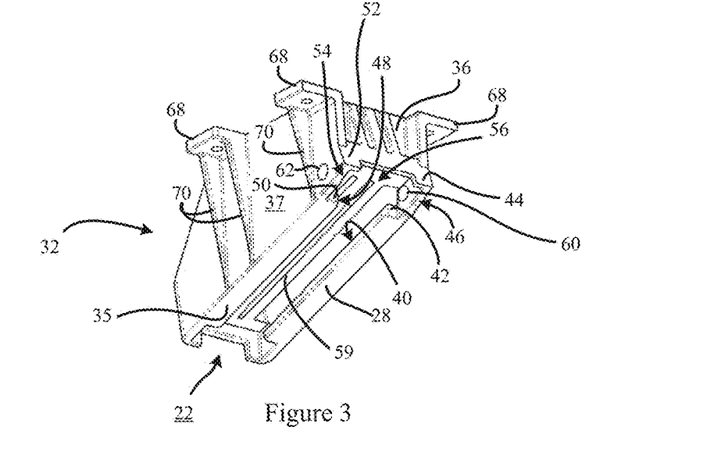
FIG. 3 shows another exemplary ramp mount according to some embodiments of the present invention.
Figure 4:
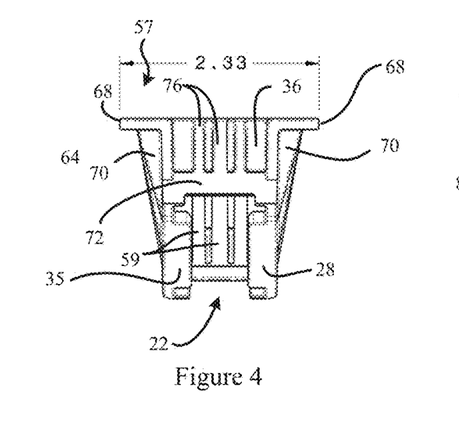
FIG. 4 shows a front view of the exemplary ramp mount of FIG. 3.
Figure 5:
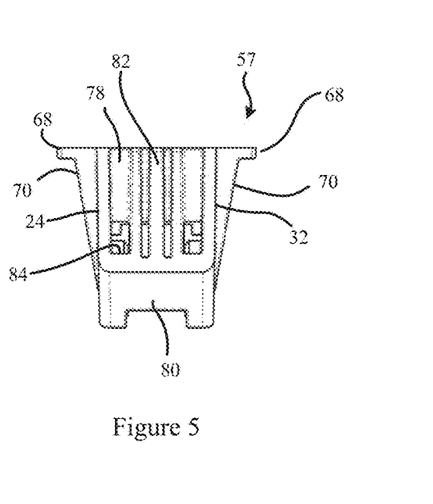
FIG. 5 shows a back view of the exemplary ramp mount of FIG. 3.
Figure 6:
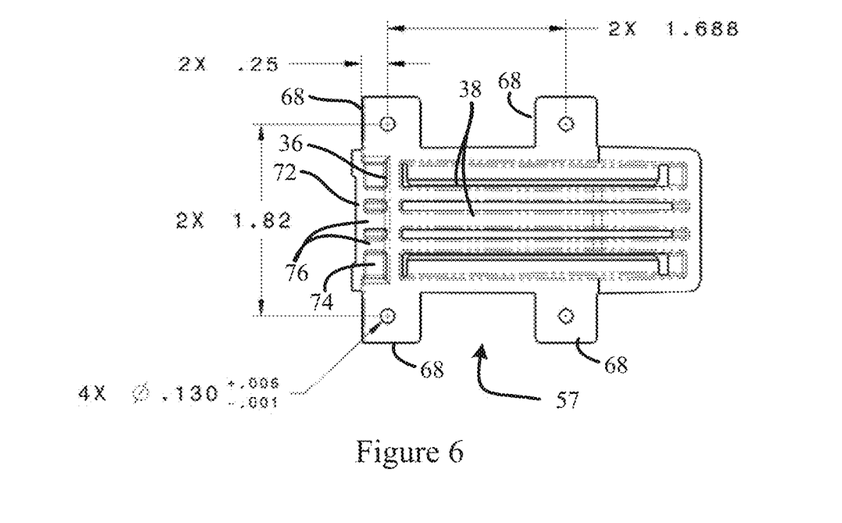
FIG. 6 shows a top view of the exemplary ramp mount of FIG. 3.
Figure 7:
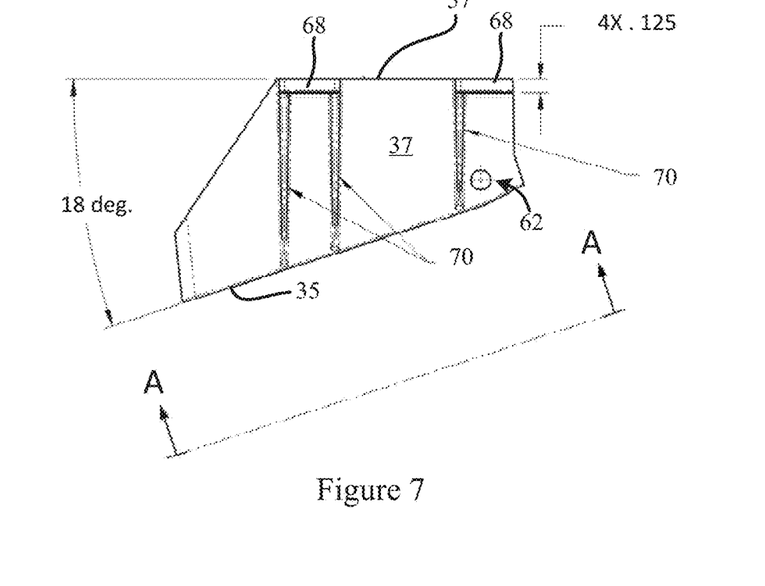
FIG. 7 shows a side view of the exemplary ramp mount of FIG. 3.
Figure 8:
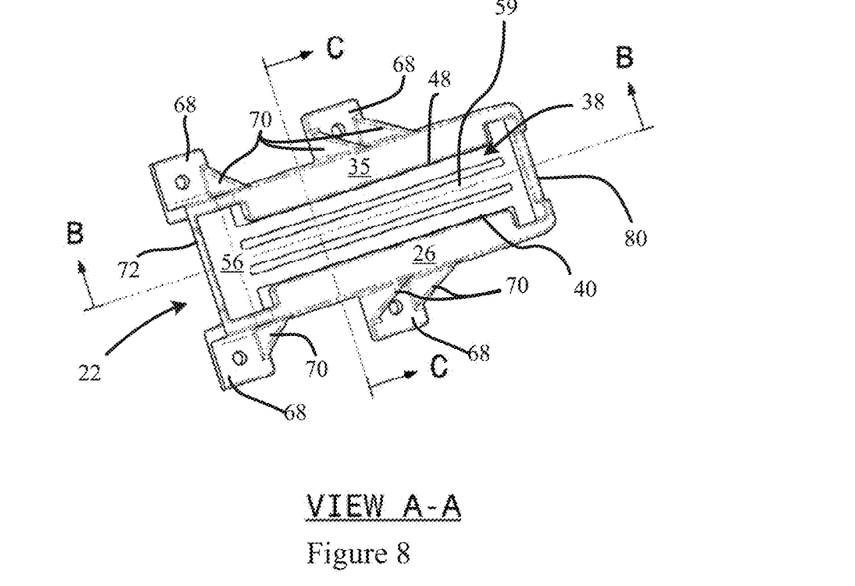
FIG. 8 shows a view along A-A (FIG. 7) of the exemplary ramp mount of FIG. 3.
Figure 9:
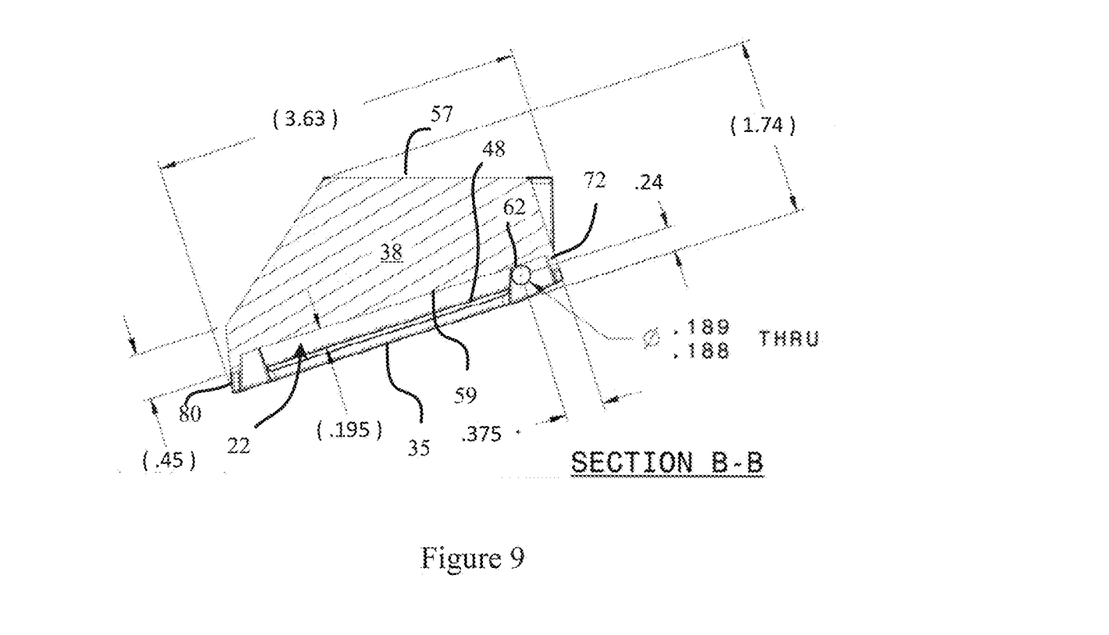
FIG. 9 shows a cross-sectional view along B-B (FIG. 8) of the exemplary ramp mount of FIG. 3.
Figure 10:
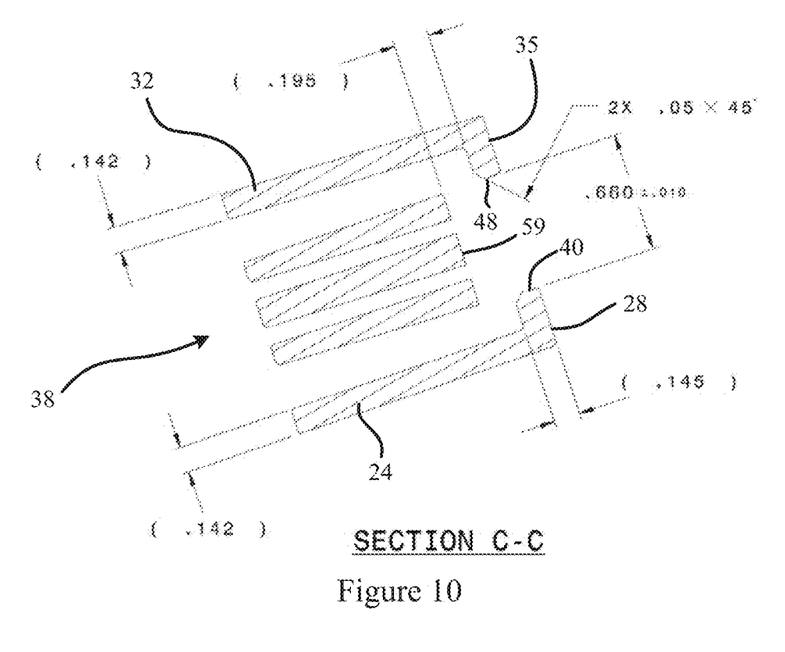
FIG. 10 shows a cross-sectional view along C-C (FIG. 8) of the exemplary ramp mount of FIG. 3.

FIG. 3 shows another exemplary mount 16b according to some embodiments of the present invention. Mount 16b may have similar features of mount 16 but may have different component dimensions and angles. As such, like reference numerals and characters are used to designate identical, corresponding, or similar components. FIG. 4 shows a front view of the exemplary mount 16b of FIG. 3. FIG. 5 shows a back view of the exemplary mount 16b of FIG. 3. FIG. 6 shows a top view of the exemplary mount 16b of FIG. 3. FIG. 7 shows a side view of the exemplary mount 16b of FIG. 3. FIG. 8 shows a view along A-A (FIG. 7) of the exemplary mount 16b of FIG. 3. FIG. 9 shows a cross-sectional view along B-B (FIG. 8) of the exemplary mount 16b of FIG. 3. FIG. 10 shows a cross-sectional view along C-C (FIG. 8) of the exemplary mount 16b of FIG. 3.

As can be seen in FIG. 4, a width of mount 16b (from the cantilevered ends of tabs 68) may be about 2.33 inches, in some embodiments. This dimension is non-limiting. For example, in some embodiments the dimensional range may be between 2.00-3.50 inches in accordance with the passenger place width.

FIG. 5 illustrates a back crosspiece (or wall) 78 of mount 16b and a back wall 80 of track 22. When slider 20 is adjacent to or engages back wall 80 of track 22, a coupled seat diaphragm 12 may be in a recline position relative to a seat frame 14 coupled with slider 20. Back wall 80 of mount 16b may be configured to prevent further movement of slider 20 once the seat diaphragm 12 is moved to the recline position from the upright position relative to frame 14.

A plurality of structural fins 82 may couple the top surface 84 of the back wall 80 with an outer surface of back wall 78. The structural fins 82 may have a cross-sectional area that is greatest at the top surface 84 of the back wall 80 and that may decrease as the structural fins 82 extend toward the top surface 57 of mount 16b. Optionally, the structural fins 82 may have a back surface that is coplanar with a back surface of first side wall 24 and second side wall 32. In some embodiments, the structural fins 82 may correspond with one of the plurality of ribs 38. Optionally, the side surfaces of structural fins 82 may be coplanar with side surfaces of an associated rib 38.

As can be seen in FIG. 6, a center of the holes of tabs 68 on each side of the mount 16b may be spaced apart by about 1.688 inches. The center of holes of tabs 68 on opposite sides of mount 16b may be spaced apart by about 1.82 inches. The holes may have a diameter of approximately 0.130 inches. A center of holes of tabs 68 may also be about 0.25 inches from a front edge of tab 68. As should be understood, the disclosed dimensions are exemplary only. The center of the holes of the tab 68 on opposite sides of the mount 16b dimension may change depending on the size of the passenger place and may be spaced apart a distance between 1.025-2.25 inches in other embodiments. Additionally, the hole diameter may range from 0.09-0.187 inches depending on rivet size.

FIG. 7 shows how a top surface 57 may be at an angle of 18 degrees relative to a bottom surface of side wall 35. As such, a track 22 may also be at an angle of 18 degrees relative to the top surface 57. While mount 16b is illustrated with an angle of 18 degrees, it should be recognized that the angle is exemplary and non-limiting. In other embodiments, the angle between top surface 57 and track 22 may be between 15-20 degrees. Some embodiments the degree may be in a range of 7-25 degrees in accordance with the passenger place width. In some embodiments, the tabs 68 may have a thickness of about 0.125 inches. Optionally, structural fins 70 may have a thickness of about 0.08-0.95 inches. Additionally, thickness of the tabs may change due to rivet location (e.g., thickness may be in a range of 0.125-0.20) and further, the thickness of the structural fins may range between 0.08-0.125 inches in certain embodiments.

Cross-sectional view of section B-B illustrated in FIG. 9 shows that a distance between bottom surface 59 of rib 38 and a top surface of rim 48 may be about 0.195 inches, in certain embodiments. Although not illustrated, it should be understood that similar distances may be provided between bottom surface 59 of rib 38 and a top surface of rim 40. Hole 62 may have an axis that is spaced about 0.24 inches, in certain embodiments, from a bottom surface 35. Additionally, hole 60 may have an axis that is spaced apart a similar distance from a bottom surface 26. Optionally, the axis of hole 62 (and hole 60) may be spaced about 0.375 inches from the front surface of wall 72, in certain embodiments. Hole 62 (and hole 60 may have a diameter of about 0.18-19 inches. Range of hole 62 and hole 60 may change and may be in range of 0.18-0.21 inches in certain embodiments depending on recline requirements requested by customer.

Cross-sectional view of section C-C illustrated in FIG. 10 shows that first and second side wall 24, 32 may have a thickness of about 0.142 inches. Additionally, rim 40 and rim 48 may have a thickness of about 0.145 inches. A distance between the cantilevered end of rim 40 and the cantilevered end of rim 48 may be about 0.66. Further, rim 40 and rim 48 may have a beveled edge between the cantilevered end and a top surface of rim 40 and rim 48, respectively. The beveled edge may be at about a 45-55 degree angle relative to the top surfaces of rim 40, 48, respectively, in some embodiments.

While mount 16b is described with particular dimensions, it should be understood that these dimensions are exemplary and non-limiting. Different dimensions and arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

As mentioned above, mounts (e.g., mount 16, 16b, etc.) of the present disclosure may be manufactured as a single integral piece in certain embodiments. Optionally, in some embodiments, the mounts of the present disclosure may be an injection molded material. The material may be a plastic injection mold to meet DFM and certification requirements such as smoke, toxicity and heat release as specified by the air framer (e.g., RTP 205 FR (WA9500-134)).

What is claimed is:

1. A ramp mount for use in a passenger seat system, the ramp mount comprising:
    a first side wall having a top side, a bottom side opposite the top side, an outer surface, and an inner surface opposite the outer surface;
    a second side wall spaced apart from the first side wall, the second side wall having a top side, a bottom side opposite the top side, an outer surface, and an inner surface opposite the outer surface;
    a front wall integrated with a front portion of the first side wall and a front portion of the second side wall;
    a back wall integrated with a back portion of the first side wall and a back portion of the second side wall;
    wherein the bottom side of the first side wall forms a first rim that extends toward the second side wall, a front end of the first rim being spaced apart from a front end of the first side wall by a first gap;
    wherein the bottom side of the second side wall forms a second rim that extends toward the first side wall, a front end of the second rim being spaced apart from a front end of the second side wall by a second gap;
    wherein the first rim and the second rim define a track configured for slideably engaging with a slider, wherein the track is closed laterally outwardly by the first and second side walls and is closed at least partially forwardly by the front wall;
    wherein an opening of the track is defined in part by the first gap and the second gap, the opening of the track configured for receiving the slider into the track;
    wherein the top sides of the first side wall and the second side wall define a top surface of the ramp mount that is configured to be coupled with a passenger seat diaphragm, and wherein the track is not parallel to the top surface of the ramp mount; and
    wherein the ramp mount is formed as one-piece.

2. The ramp mount of claim 1, wherein the track is at an angle between 10-25 degrees relative to the top surface of the ramp mount.

3. A ramp mount for use in a passenger seat system, the ramp mount comprising:
    a first side wall having a top side, a bottom side opposite the top side, an outer surface, and an inner surface opposite the outer surface; and
    a second side wall spaced apart from the first side wall, the second side wall having a top side, a bottom side opposite the top side, an outer surface, and an inner surface opposite the outer surface;
    wherein the bottom side of the first side wall forms a first rim that extends toward the second side wall, a front end of the first rim being spaced apart from a front end of the first side wall by a first gap;
    wherein the bottom side of the second side wall forms a second rim that extends toward the first side wall, a front end of the second rim being spaced apart from a front end of the second side wall by a second gap;
    wherein the first rim and the second rim define a track configured for slideably engaging with a slider;
    wherein an opening of the track is defined in part by the first gap and the second gap, the opening of the track configured for receiving the slider into the track; and wherein the first side wall includes a first hole extending from the outer surface of the first side wall to the inner surface of the first side wall, wherein the first hole of the first side wall is positioned between the front end of the first side wall and the front end of the first rim, and wherein the second side wall includes a second hole extending from the outer surface of the second side wall to the inner surface of the second side wall, wherein the second hole of the second side wall is positioned between the front end of the second side wall and the front end of the second rim; wherein the first hole and the second hole are axially aligned with each other to receive a pin therethrough, wherein the pin is positioned in and directly blocks the opening to prevent the slider from disengaging with the track through the opening with the pin is received through the first and second holes.

4. The ramp mount of claim 3, wherein the pin does not engage with a ramp latch when received through the first hole and the second hole.

5. The ramp mount of claim 3, further comprising:
a front wall integrated with a front portion of the first side wall and a front portion of the second side wall;
a back wall integrated with a back portion of the first side wall and a back portion of the second side wall; and
a plurality of ribs extending between the front wall and the back wall, the plurality of ribs each having a bottom side that is coplanar with one another,
wherein the bottom sides of the plurality of ribs define a portion of the track.

6. The ramp mount of claim 3, wherein the ramp mount is entirely formed from one piece of injection molded material.

7. The ramp mount of claim 6, wherein the injection molded material comprises a plastic.

8. The ramp mount of claim 4, further comprising a diaphragm coupled with the ramp mount, and wherein a bracket is not used to couple the ramp mount with the diaphragm.

9. A ramp mount for use in a passenger seat system, the ramp mount comprising:
a first side wall having a top side, a bottom side opposite the top side, an outer surface, and an inner surface opposite the outer surface;
a second side wall spaced apart from the first side wall, the second side wall having a top side, a bottom side opposite the top side, an outer surface, and an inner surface opposite the outer surface, the inner surface of the second side wall facing the inner surface of the first side wall and forming, at least in part, a track configured to slidingly receive a slider fixed relative to a seat frame of the passenger seat system; and
a plurality of spaced apart ribs disposed between the first and second side walls, the plurality of ribs extending lengthwise parallel to each other and i spaced apart relation to each other and the first and second sidewalls between (i) a front portion of the first and second side walls and (ii) a rear portion of the first and second side walls,
wherein the ramp mount is formed as one-piece configured to be fixed to an underside of a seat diaphragm of the passenger seat system.

10. The ramp mount of claim 9, wherein:
the bottom side of the first side wall forms a first rim that extends toward the second side wall, a front end of the first rim being spaced apart from a front end of the first side wall by a first gap; and
the bottom side of the second side wall forms a second rim that extends toward the first side wall, a front end of the second rim being spaced apart from a front end of the second side wall by a second gap.

11. The ramp mount of claim 10, wherein:
the track is defined in part by the first rim and the second rim, the track being configured for slideably engaging with the slider of the passenger seat system; and
an opening of the track is defined in part by the first gap and the second gap, the opening of the track configured for receiving the slider into the track.

12. The ramp mount of claim 11, wherein the top sides of the first side wall and the second side wall define a top surface of the ramp mount that is configured to be coupled with a passenger seat diaphragm and wherein the track is not parallel to the top surface of the ramp mount.

13. The ramp mount of claim 12, wherein the plurality of spaced apart ribs each have a top side that is coplanar with the top sides of the first side wall and the second side wall, and wherein the top sides of the first side wall, the second side wall, and the plurality of spaced apart ribs define the top surface of the ramp mount.

14. The ramp mount of claim 9, further comprising one or more tabs disposed at the top side of the first side wall and extending outwardly and one or more tabs disposed at the top side of the second side wall and extending outwardly, the one or more tabs each including a hole for receiving a rivet therethrough for securing the ramp mount to a passenger seat diaphragm.

15. The ramp mount of claim 14, further comprising one or more structural fins extending between a bottom surface of the one or more tabs disposed at the top side of the first side wall and the outer surface of the first side wall and one or more structural fins extending between a bottom surface of the one or more tabs disposed at the top side of the second side wall and the outer surface of the second side wall.

16. The ramp mount of claim 9, further comprising a structural fin corresponding to each of the plurality of spaced apart ribs, wherein the structural fins are attached to at least one of (i) a front crosspiece extending between the first and second side walls and (ii) a rear crosspiece extending between the first and second side walls.

17. The ramp mount of claim 16, whereinthe structural fins are attached to a front crosspiece extending between the first and second side walls.

18. The ramp mount of claim 16, whereinthe structural fins are attached to a rear crosspiece extending between the first and second side walls.

19. The ramp mount of claim 9, wherein the plurality of spaced apart ribs each comprise a top side that is coplanar with the top sides of the first and second side walls.

* * * * *